United States Patent [19]

Kitagawa et al.

[11] Patent Number: 5,089,555
[45] Date of Patent: Feb. 18, 1992

[54] THERMOSETTING POWDER COMPOSITION

[75] Inventors: Katsuji Kitagawa, Kasukabe; Hideki Tashima, Fukuoka; Kunimitsu Matsuzaki, Yono, all of Japan

[73] Assignee: Somar Corporation, Japan

[21] Appl. No.: 404,806

[22] Filed: Sep. 8, 1989

[30] Foreign Application Priority Data

Mar. 10, 1989 [JP] Japan .................. 1-59142

[51] Int. Cl.$^5$ .............................................. C08F 8/30
[52] U.S. Cl. ...................................... 524/503; 428/500; 428/522; 524/506; 525/58; 525/60; 525/61; 525/132; 525/378.7; 525/328.8; 525/329.8; 525/329.9; 525/340; 525/353; 525/359.1; 525/377; 525/420; 525/425; 525/437; 525/445
[58] Field of Search ............... 525/379, 123, 132, 58, 525/60, 61, 340, 353, 359.1, 420, 425, 437, 445; 524/503, 506; 428/500, 522

[56] References Cited

U.S. PATENT DOCUMENTS 4,404,330 9/1983 Ikeguchi ........................ 525/374
4,585,855 4/1986 Gako et al. ..................... 525/374

FOREIGN PATENT DOCUMENTS

| | | |
|---|---|---|
| 070118 | 1/1983 | European Pat. Off. . |
| 56-157426 | 12/1981 | Japan . |
| 56-157453 | 12/1981 | Japan . |
| 62-57420 | 3/1987 | Japan . |
| 63-30558 | 7/1988 | Japan . |

*Primary Examiner*—Bernard Lipman
*Attorney, Agent, or Firm*—Lorusso & Loud

[57] ABSTRACT

A thermosetting powder composition is disclosed which comprises:
  a functional thermoplastic resin capable of reacting with a cyanate group and a molecular weight of at least 10,000;
  a polyfunctional cyanate compound; and
  a viscosity controlling agent which is a compound having at least one functional group capable of reacting with the functional thermoplastic resin and/or the polyfunctional cyanate compound and a molecular weight of less than 10,000. The composition is useful as a powder coating composition or a raw material for the formation of molded articles.

18 Claims, No Drawings

THERMOSETTING POWDER COMPOSITION

This invention relates to a thermosetting powder composition which gives coatings or shaped bodies having excellent properties such as flexibility, thermal stability, resistance to chemicals, toughness and bonding strength.

One known thermosetting composition capable of giving a flexible cured product includes a saponified ethylene copolymer with a vinyl ester, and an inorganic filler (Japanese Published Unexamined Patent Application (Tokkyo Kokai) No. 62-143980). A composition containing an ethylene-vinyl acetate copolymer and an cyanate compound is also known to give a flexible cured product (Tokkyo Kokai No. 62-79245). These compositions, however, fail to give thermally stable cured product.

Epoxy resins and phenol resins are known to give a cured product having a good thermal resistance. These resins, however, are poor in flexibility. A thermosetting powder coating composition containing a polyfunctional cyanate compound and a polyfunctional maleimide is known (Tokkyo Kokai 50-129700). Cured products obtained from this composition have a poor flexibility, though they exhibit high resistance to heat and chemicals. Tokkyo Kokai No. 60-192779 discloses an adhesive composition in the form of a liquid or a vanish containing a low crystalline or non-crystalline thermoplastic saturated polyester resin, a polyfunctional cyanate compound and a polyfunctional maleimide.

The present invention is aimed at the provision of a thermosetting powder composition which forms upon being cured coatings or shaped bodies having both excellent flexibility and high thermal resistance.

In accordance with one aspect of the present invention there is provided a thermosetting powder composition comprising:
a functional thermoplastic resin capable of reacting with a cyanate group and a molecular weight of at least 10,000;
a polyfunctional cyanate compound; and
a viscosity controlling agent which is a compound having at least one functional group capable of reacting with said functional thermoplastic resin and/or said polyfunctional cyanate compound and a molecular weight of less than 10,000.

In another aspect, the present invention provides a composite material comprising a substrate, and a layer provided over a surface of the substrate and formed of a cured product of the above powder composition.

In a further aspect, the present invention provides a shaped article obtained by a molding the above powder composition at a temperature sufficient to fuse and to cure the powder composition.

The present invention will now be described in detail below.

The functional thermoplastic resin to be used in the present invention should contain one or more functional groups capable of reacting with a cyanate group. Examples of such functional groups include an alcoholic or phenolic hydroxyl group, a carboxylic group, an amino group and an amide group. Illustrative of suitable functional thermoplastic resins are partially saponified polyvinyl acetates, polyvinyl alcohols, partially saponified ethylene/vinyl acetate copolymers, butylal resins, polyacrylic acid, copolymers of acrylic acid, polymethacrylic acid, copolymers of methacrylic acid, saturated polyester resins, polyamide resins and polyamideamine resins.

For reasons of improved bonding of a coated layer to a metal substrate, it is preferred that the functional thermoplastic resin contain both hydroxyl and carboxyl groups. Such a polymer containing both hydroxyl and carboxyl groups can be obtained by, for example, conducting the polymerization for the production of a hydroxyl group-containing polymer, such as a butylal resin or a partially saponified ethylene/vinyl acetate copolymer, in the presence of a copolymerizable unsaturated carboxylic acid, such as maleic anhydride, acrylic acid, methacrylic acid or itaconic acid. Alternatively, grafting of such an unsaturated carboxylic acid onto a hydroxyl group-containing polymer can give a polymer containing both hydroxyl and carboxyl groups.

The thermoplastic resin may be used in combination with an adjuvant resin, such as a polyolefin, an ethylene/vinyl acetate copolymer, a polyvinyl chloride, an ethylene/ethyl acrylate copolymer or an epoxy resin, which does not react with a cyanate compound. Examples of suitable polyolefins include polyethylenes, ethylene/propylene copolymers, polypropylenes and polybutene-1. When such an adjuvant resin is used, the amount of the functional thermoplastic resin is generally 50% by weight or more, preferably 60% by weight or more based on the total weight of the functional thermoplastic resin and the adjuvant resin.

The polyfunctional cyanate compound to be used in the present invention is an organic compound having two or more cyanate groups and includes a monomer having two or more cyanate groups, a prepolymer thereof, and a prepolymer thereof with an amine. As the monomer there may be preferably used a compound of the general formula: $Ar(OCN)_m$ wherein Ar is an aromatic group and m is an integer of 2-5, or a prepolymer thereof.

Examples of the monomeric polyfunctional cyanate compounds having the above general formula include benzene dicyanate, benzene tricyanate, naphthalene dicyanate, 4,4'-dicyanatobiphenyl, bis(4-cyanatophenyl)methane, 2,2-bis(4-cyanatophenyl)propane, 2,2-bis(3,5-dichloro-4-cyanatophenyl)propane, bis(4-cyanatophenyl)ether, bis(4-cyanatophenyl)sulfone, tris(4-cyanatophenyl)phosphite, tris(4-cyanatophenyl)phosphate, and cyanic acid esters obtained by reaction of a novolak resin with a halogenated cyan compound.

Prepolymers of the above monomeric polyfunctional cyanate compounds may be obtained by polymerizing the monomers in the presence of a catalyst such as a mineral acid or a Lewis acid. The resulting prepolymers generally contain triazine rings. Prepolymers of the above monomeric polyfunctional cyanate compounds with an amine may be obtained by reaction between them. As the amine, there may be used phenylenediamine, xylylenediamine, diaminobiphenyl and bis-(aminophenyl)propane.

The amount of the polyfunctional cyanate compound is generally 10-100 parts by weight, preferably 30-80 parts by weight per 100 parts by weight of the functional thermoplastic resin.

It is preferred that the polyfunctional cyanate compound be used in combination with a polyfunctional maleimide compound for reasons of improved thermal resistance of cured products. The maleimide compound is an organic compound having two or more N-maleimide groups and includes a monomer having two or more N-maleimide groups, a prepolymer thereof, and a prepolymer thereof with an amine. As the monomer there may be preferably used a compound of the general formula:

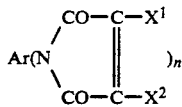

wherein Ar is an aromatic or alicyclic group, $X^1$ and $X^2$ are, independently from each other, hydrogen, a halogen or an alkyl and n is an integer of 1–5.

The monomeric maleimide compound of the above formula may be obtained by a conventional method wherein a maleic anhydride compound is reacted with a polyamino compound to form a maleamide acid, the resulting maleamide acid being subjected to dehydrative cyclization. The polyamino compound may be, for example, phenylenediamine, xylylenediamine, cyclohexanediamine, 4,4'-diaminobiphenyl, bis(4-aminophenyl)methane, bis(4-aminophenyl)ether, bis(4-amino-3-methylphenyl)methane, 2,2-bis(4-aminophenyl)propane, 2,2-bis(4-amino-3-methylphenyl)-propane, 2,2-bis(4-amino-3-chlorophenyl)propane or 1,1-bis(4-aminophenyl)-1-phenylethane.

Prepolymers of the above monomeric polyfunctional maleimide compounds may be obtained by heating the monomers in the presence of a catalyst such as an organic acid salt or a peroxide. Prepolymers of the above monomeric polyfunctional maleimide compounds with an amine may be obtained by reaction between them. As the amine, there may be used the above polyamino compounds.

When the polyfunctional cyanate compound is used in combination with the polyfunctional maleimide compound, they may be used in the form of a mere mixture or in the form of a reaction product (so called "B-stage" resin). Such a B-stage resin may be obtained by reacting the both compounds preferably in the presence of a suitable catalyst such as an organometal salt or a tertiary amine.

The amount of the polyfunctional maleimide compound is generally up to 40%, preferably 10–30 % based on the total weight of the polyfunctional cyanate compound and the polyfunctional maleimide compound. The total amount of the polyfunctional cyanate compound and the polyfunctional maleimide compound is generally 20–120 parts by weight, preferably 40–90 parts by weight per 100 parts by weight of the functional thermoplastic resin.

The viscosity controlling agent is a compound having a molecular weight of less than 10,000, preferably 150–5,000 and one or more functional groups capable of reacting with the polyfunctional cyanate compound and/or the functional thermoplastic resin when heated at a temperature sufficient to melt a mixture of the functional thermoplastic resin, the polyfunctional cyanate compound and the viscosity controlling agent, generally at a temperature of 120° C. or higher. Preferably, the viscosity controlling agent to be employed in the present invention is a solid or paste at room temperature and has a softening point or melting point of 100° C. or less. However, a liquid, viscosity controlling agent may be used as long as the resulting composition can be in the form of powder.

Examples of the viscosity controlling agent include a polyol compound, a polyamine compound, an amide compound, a fatty amine or a salt thereof, a polyfunctional methacrylate, a polyfunctional acrylate, an acrylate modified with caprolactone and a methacrylate modified with caprolactone. An oligomer of the above-described functional thermoplastic resin may also be used.

The polyol compound is preferably (a) an ether-containing diols having the following general formula:

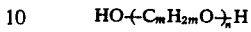

wherein m is a positive integer, preferably 2–6 and n is an integer of at least 2, preferably 10–150, (b) an ester-containing diols having the following general formula:

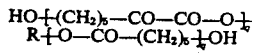

wherein R stands for an alkylene having 2–10 carbon atoms and q is an integer of 1 or more, preferably 3–40, or (c) a saturated hydrocarbon having 1.5–3 terminal hydroxyl groups and a molecular weight of 1000–5000. These polyol compounds can react with the above polyfunctional cyanate compound and with thermoplastic resins having amino or carboxyl groups.

The polyamine compound is preferably a diamine having the formula:

wherein n is an integer of 20–150. These polyamines can react with the above polyfunctional cyanate compound and with thermoplastic resins having amino or carboxyl groups.

The amide compound to be used as the viscosity controlling agent is preferably a fatty amide such as stearylamine acetate. Amides containing ethylenically unsaturated groups such as diacetone acrylamide of the formula: $CH_2=CHCONHC(CH_3)_2CH_2COCH_3$ may be also suitably used. Such an unsaturated group-containing amide can react with the above polyfunctional cyanate compounds and is polymerizable per se and copolymerizable with the above maleimide compounds.

The fatty amine to be used as the viscosity controlling agent may be tallow amine, stearylamine or distearylamine.

The viscosity controlling agent serves to lower the viscosity of a melt of the powder composition and to facilitate the deposition thereof to a solid surface to be coated. When the powder composition is used for the production of molded articles, the viscosity controlling agent serves to control the melt index thereof within a suitable range. The viscosity controlling agent is preferably used in an amount so that the powder composition shows a horizontal melt flow of 5–40%. The term "horizontal melt flow" used in the present specification and appended claims is defined by the following equation:

$$MF = \frac{d - 16}{16} \times 100 \, (\%)$$

wherein MF is the horizontal melt flow and d is a diameter of a melt of the sample composition (1 g) formed into a tablet having a diameter of 16 mm and heated on a horizontal, flat, soft steel plate at 140° C. When the melt flow is smaller than 5%, there is a danger of causing pin holes in the resulting coating. On the other hand, a melt flow of greater than 40% tends to cause the formation of "icicles". The amount of said viscosity controlling agent varies with the kind thereof and is generally 5–100 parts by weight per 100 parts by weight of the functional thermoplastic resin. Specifically, the amount is preferably 20–60 parts by weight per 100 parts by weight of the thermoplastic resin when a polyol compound is used. In the case of a polyamine compound, the amount is preferably 5–30 parts by weight.

The powder composition of the present invention may further contain a crosslinking agent such as a polyisocyanate compound, an organic peroxide or a mixture thereof.

The polyisocyanate compound is a compound having two or more isocyanate group and is preferably a solid at room temperature. Illustrative of suitable isocyanate compounds are phenylenediisocyanate, tolylenediisocyante, biphenylene-diisocyanate and diphenylmethane-p,p-diisocyanate. Blocked polyisocyante compounds having their isocyanate groups blocked with an active hydrogen-containing compound such as an amide, a lactam, phenol, an alcohol, an oxyme or a mercaptane can also be suitably used for the purpose of the present invention. $\epsilon$-Caprolactam is a particularly preferred active hydrogen-containing compound. For example, a compound having the formula:

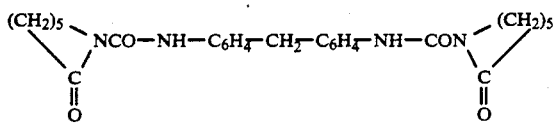

may be suitably used as the cross-linking agent.

The polyisocyante compound or its blocked derivative can react with the functional groups of the functional thermoplastic resin to cross-link same. It can also react with the viscosity controlling agent to form high molecular weight compounds. The polyisocyanate compound is used in an amount providing a ratio (NCO/OH) of equivalents of the isocyanate group per equivalent of the functional group in the composition of less than 1, preferably 0.03–0.8.

The organic may be, for example, dicumyl peroxide, bis(t-butylperoxy)isopropylbenzene, dimethyldi(t-butylperoxy)hexane or dimethyldi(t-butylperoxy)hexyne. The organic peroxide can react with tertiary hydrogen of the resin to form crosslinkages. The amount of the organic peroxide is generally 0.5–7.0 parts by weight, preferably 1.0–4.0 parts by weight per 100 parts by weight of the thermoplastic resin.

Various additives may be incorporated into the powder composition according to the present invention. For example, a catalyst such as organic base, a phenol compound, an organometallic salt, inorganic metal salt or acid anhydride may be used for facilitating the reaction between a polyfunctional cyanate compound a polyfunctional maleimide compound. An organic or inorganic filler may be used for controlling the viscosity of a melt of the composition and the strength of coatings or shaped bodies obtained from the composition. When the composition is to be cured by irradiation of UV rays, a photosensitizer may be incorporated into the composition. A colorant, a thixotropy-imparting agent or oxidation-preventing agent may also be added as desired.

The powder composition according to the present invention is especially suitably used as a powder coating composition. Such a coating composition may be obtained by mixing and kneading the above components with each other at a temperature higher than the melting point of the resin, pelleticizing the kneaded mixture, and grinding the pellets. The mixing step is desirably carried out at a temperature lower than the temperature at which the cross-linking occurs so that the occurrence of cross-linking is substantially prevented. Further, it is advantageous to carry out the grinding step while cooling the pellets with, for example, liquid nitrogen to a temperature lower than the brittle temperature of the resin.

The powder coating composition preferably has such a particle size distribution that the content of particles with a particle size of 30 mesh (Tyler) or finer is 100% by weight, the content of particles with a particle size of 200 mesh or finer is at least 50% by weight and the content of particles with a particle size of 325 mesh or finer is not greater than 50% by weight, for the purpose of facilitating the deposition of the coating composition onto a substrate during the powder coating stage.

Coating of a substrate with the coating composition is carried out in a manner known per se by, for example, contacting a substrate, preheated to a temperature sufficient to cause the crosslinking of the thermoplastic resin, with a fluidized mass of the coating composition. By this, the powder of the coating composition deposits on the surface of the substrate and the deposits are melted and undergo cross-linking, thereby forming a coated layer. Any thermally stable substrate such as formed of a metal or a ceramic may be used.

The cured product obtained from the thermosetting powder composition according to the present invention is excellent in both flexibility and heat resistance. The cured coating exhibits high bonding strength especially to a metal surface and has good toughness. Thus, the powder composition is particularly useful as a powder coating composition for use in forming a coat on a surface of a rotor of a motor. If desired, the powder composition is dissolved in a suitable solvent to form a liquid coating composition. By shaping the powder composition into a suitable shape such as a sheet, film or block at a temperature of below the curing temperature and by heating the shaped, preformed body at a temperature above the curing temperature, there is obtained a shaped article. When the preformed body is laminated on a metal or ceramic substrate and when the resulting laminate is heated under pressure, there is obtained a composite article. The powder composition may also be used as a raw material resin for the formation of a prepreg.

The following examples will further illustrate the present invention. In the examples, parts are by weight.

EXAMPLE 1

A mixture containing 100 parts of a partially saponified (saponification degree: 80%) ethylene/vinyl acetate copolymer, 50 parts of a maleimide-triazine resin, 0.3 part of an acrylic ester oligomer as a leveling agent, 0.5 part of dicumyl peroxide, 0.4 part of a blocked isocyanate and 20 parts of a polyol compound was premixed under dried state and extruded at 120° C. The extrudate was cooled to obtain pellets and the pellets were finely ground while cooling with liquid nitrogen, to obtain a powder composition. The maleimide-triazine resin (BT2170 manufactured by Mitsubishi Gas Chemicals, Inc.) is composed of 90% by weight of 2,2-bis(cyanatophenyl)propane and 10% by weight of bis(4- maleimidephenyl)methane and has a density of 1.24, a melting point of 70° C. and a grass transition point (upon curing) of 230-250 ° C. The blocked isocyanate used is a compound of the formula:

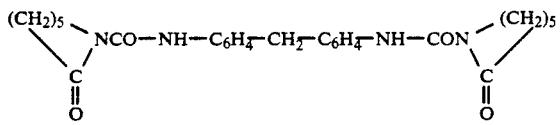

The polyol used is a wax-like substance of the formula:

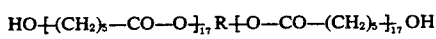

where R is tetramethylene, and has an average molecular weight of about 4,000.

The powder composition thus obtained was then subjected to the following tests and the test results were as summarized in Table 1.

(1) Gel time:

In accordance with JIS C 2104. Test was performed at a hot plate temperature of 200° C.

(2) Horizontal melt flow:

The sample composition (1 g) was shaped into a disc having a diameter of 16 mm. The disc was placed on a flat, soft steel plate and the plate was placed in an oven maintained at 140° C. to melt the disc. The diameter (d) of the melted sample was measured. The horizontal melt flow (MF) was calculated as follows:

$$MF = \frac{d - 16}{16} \times 100 \ (\%)$$

(3) Tensile strength:

The composition was subjected to powder coating to obtain a strip having a thickness of 1.0–1.5 mm, a width of 10 mm and a length of 50 mm. Tensile strength of the strip was measured in accordance with JIS K 7113-1 at room temperature and after maintained at 300° C. for 24 hours.

(4) Elongation:

Test sample was prepared in the same manner as in the above Tensile Strength Test. The elongation at the time of breakage by stretching was measured at room temperature and after maintained at 300° C. for 24 hours.

EXAMPLE 2

Example 1 was repeated in the same manner as described except that the amount of the polyol compound was increased to 40 parts. The test results are shown in Table 1.

EXAMPLE 3

Example 1 was repeated in the same manner as described except that, as the polyol compound, a compound expressed by the formula:

and having an average molecular weight of about 3,000 was used. This polyol compound, too, was wax-like. The test results are shown in Table 1.

COMPARATIVE EXAMPLE 1

Example 1 was repeated in the same manner as described except that no polyol compound was used. The test results were as shown in Table 1.

EXAMPLE 4

Example 1 was repeated in the same manner as described except that a saturated polyester resin (SP-154 manufactured by Nihon Gosei Kagaku K. K., average molecular weight: 19,000, softening point: 132, OH value (mg KOH/g): 3–7) was used in place of the partially saponified copolymer and that dicetoneacrylamide (10 parts) was used in place of the polyol compound. The test results are shown in Table 1.

EXAMPLE 5

Example 1 was repeated in the same manner as described except that a polamideamine (Tomide #1350 manufactured by Fuji Kasei K. K., average molecular weight: 10,000, softening point: 142, amine value: 2.0) was used in place of the partially saponified copolymer and that a polyethylene glycol amine (10 parts) expressed by the formula:

wherein n is 88 and having an average molecular weight of 4,000 and a melting point of about 60° C. was used in place of the polyol compound. The test results are shown in Table 1.

EXAMPLE 6

Example 5 was repeated in the same manner as described except that 2,2-bis(cyanatophenyl)propane was used in place of the maleimide-triazine resin. The results are shown in Table 1.

TABLE 1

| Example No. | Gel time (sec) | MF (%) | Tensile strength (kg/mm2) | | Elongation (%) | |
|---|---|---|---|---|---|---|
| | | | Initial | After heating | Initial | After heating |
| 1 | 35 | 24.8 | 1.20 | 0.50 | 58.0 | 110.5 |
| 2 | 24 | 35 | 1.30 | 0.55 | 61.5 | 120.0 |
| 3 | 30 | 21.5 | 1.25 | 0.45 | 60.5 | 117.3 |
| Comp. 1 | 38 | 4 | 1.15 | 0.23 | 38.5 | 95.3 |
| 4 | 38 | 26 | 1.35 | 0.68 | 73 | 105.0 |
| 5 | 21 | 15.5 | 1.48 | 0.73 | 68 | 113 |
| 6 | 15 | 12.3 | 1.39 | 0.75 | 70.5 | 119 |

EXAMPLE 7

Example 3 was repeated in the same manner as described except that a copolymer obtained by grafting an unsaturated carboxylic acid (Dumilane C-2280, manufactured by Takeda Yakuhin Kogyo K. K.) to the partially saponified ethylene/vinyl acetate copolymer was used in place of the partially saponified ethylene/vinyl acetate copolymer. The powder composition was found to show satisfactory test results.

EXAMPLE 8

Example 3 was repeated in the same manner as described except that a butylal resin (Eslec BX-L, manufactured by Sekisui Kagaku Kogyo K. K.) was used in place of the partially saponified ethylene/vinyl acetate copolymer. The powder composition was found to show satisfactory test results.

COMPARATIVE EXAMPLE 2

Example 4 was repeated in the same manner as described except that non-saponified ethylene/vinyl acetate copolymer was used in place of the partially saponified one. The gel time of the resulting composition was 96 seconds and the horizontal melt flow was greater than 50%. The above non-saponified copolymer had poor compatibility to maleimide-azine resin. The composition was illsuited for use as a powder coating composition.

COMPARATIVE EXAMPLE 3

Example 6 was repeated in the same manner as described except that non-saponified ethylene/vinyl acetate copolymer was used in place of the partially saponified one and that the polyethylene glycol amine was not used at all. The gel time of the composition was 118 seconds and the horizontal melt flow was 2%. The composition was illsuited for use as powder coating composition.

EXAMPLE 9

The premixed mixture in Example 1 was subjected to melt-extrusion at 120° C. to form a B-stage film having a thickness of 50 μm. This film, which had a softening point of 98° C., was found to be thermosetting.

What is claimed is:

1. A thermosetting powder composition comprising:
100 parts by weight of a functional thermoplastic resin capable of reacting with a cyanate group, said functional thermoplastic resin having a molecular weight of at least 10,000 and having one or more functional groups selected from hydroxyl, carboxyl, amino and amide wherein said functional thermoplastic resin is selected from the group consisting of partially saponified polyvinyl acetates, polyvinyl alcohols, partially saponified ethylene/vinyl acetate copolymers, butyral resins, polyarcylic acid, copolymers of acrylic acid, polymethacrylic acid, copolymers of methacrylic acid, saturated polyester resins, polyamide resins and polyamideamine resins;

10-100 parts by weight of a polyfunctional cyanate compound selected from the group consisting of benzene dicyanate, benzene, tricyanate, naphthalene dicyanate, 4,4'-dicyanatobiphenyl, bis(4-cyanotophenyl)methane, 2,2-bis(4-cyanatophenyl)propane, 2,2-bis(3,5-dichloro-4-cyanatophenyl)propane, bis(4-cyanatophenyl)ether, bis(4-cyanatophenyl)sulfone, tris(4-cyanatophenyl)phosphite, tris(4-cyanatophenyl)phosphate, cyanic acid esters obtained by reaction of a novolak resin with a halogenated cyan compound and prepolymers thereof; and 5-100 parts by weight of a viscosity controlling agent which is a compound having at least one function group capable of reacting with said functional thermoplastic resin and/or said polyfunctional cyanate compound when heated at a temperature sufficient to melt a mixture of the thermoplastic resin, the cyanate compound and the viscosity controlling agent, said viscosity controlling agent being selected from the group consisting of:

ether-containing diols having the following general formula:

wherein m is a positive integer and n is an integer of 2-150, ester-containing diols having the following general formula:

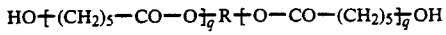

wherein R stands for an alkylene having 2-10 carbon atoms and q stands for an integer of 1-40, saturated hydrocarbons having 1.5-3 terminal hydroxyl groups and a molecular weight of 1000-5000, and diamines having the formula:

wherein n is an integer of 20-150.

2. A composition as claimed in claim 1, wherein said functional thermoplastic resin contains carboxyl groups.

3. A composition as claimed in claim 1, wherein said composition further contains an adjuvant resin which does not react with an isocyanate group in an amount less than 50% by weight of said functional thermoplastic resin.

4. A composition as claimed in claim 3, wherein said adjuvant resin is selected from polyolefins, epoxy resins, ethylene/vinyl acetate copolymers, polyvinyl chlorides and ethylene/ethyl acrylate copolymers.

5. A composition as claimed in claim 1, further comprising a polyfunctional maleimide compound.

6. A composition as claimed in claim 5, wherein said polyfunctional maleimide is a compound having the general formula:

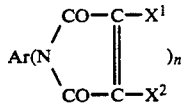

wherein Ar is an aromatic or alicyclic group, $X^1$ and $X^2$ are, independently from each other, hydrogen, a halogen or an alkyl and n is an integer of 1-5.

7. A composition as claimed in claim 5, wherein the amount of said polyfunctional maleimide compound is up to 40% based on the total weight of said polyfunctional cyanate compound and said polyfunctional maleimide compound.

8. A composition as claimed in claim 7, wherein the total amount of said polyfunctional cyanate compound and said polyfunctional maleimide compound is 20-120 parts by weight per 100 parts by weight of said functional thermoplastic resin.

9. A composition as claimed in claim 1, further comprising a crosslinking agent which is a polyisocyanate and/or an organic peroxide.

10. A composition as claimed in claim 9, wherein said polyisocyanate is selected from phenylenediisocyanate, tolylenediisocyante, biphenylenediisocyanate, diphenylmethane-p,p-diisocyanate or blocked derivatives thereof.

11. A composition as claimed in claim 10, wherein said polyisocyanate compound is blocked with an amide, a lactam, phenol, an alcohol, an oxyme or a mercaptane.

12. A composition as claimed in claim 1, wherein the the viscosity controlling agent is used in an amount so that the thermosetting powder composition has a horizontal melt flow of 5–40%.

13. A composition as claimed in claim 9, wherein said polyisocyanate compound is a compound having the formula:

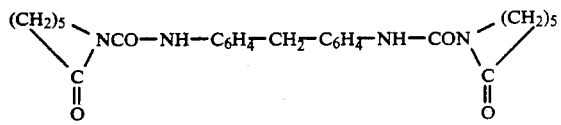

14. A composition as claimed in claim 9, wherein said organic peroxide is a member selected from the group consisting of dicumyl peroxide, bis(t-butylperoxy)isopropylbenzene, dimethyldi(t-butylperoxy)hexane and dimethyldi(t-butylperoxy)hexyne.

15. A composition as claimed in claim 1 and having such a particle size distribution that the content of particles with a particle size of 30 mesh or finer is 100% by weight, the content of particles with a particle size of 200 mesh or finer is at least 50% by weight and the content of particles with a particle size of 325 mesh or finer is not greater than 50% by weight.

16. A composition as claimed in claim 1, further comprising a finely divided inorganic filler.

17. A composite material comprising a substrate, and a layer provided over a surface of said substrate and formed of a cured powder composition according to claim 1.

18. A shaped article obtained by a molding a powder composition according to claim 1 at a temperature sufficient to fuse and to cure the powder composition.

* * * * *

UNITED STATES PATENT AND TRADEMARK OFFICE
CERTIFICATE OF CORRECTION

PATENT NO. : 5,089,555
DATED : February 18, 1992
INVENTOR(S) : KITAGAWA et al

It is certified that error appears in the above-identified patent and that said Letters Patent is hereby corrected as shown below:

Col. 9, line 46, after "benzene" delete the comma ","; and line 57, delete "function" insert --functional--.

Signed and Sealed this

Twenty-second Day of June, 1993

Attest:

MICHAEL K. KIRK

Attesting Officer

Acting Commissioner of Patents and Trademarks